No. 608,482. Patented Aug. 2, 1898.
F. E. SARGENT.
CREAMER.
(Application filed Jan. 15, 1898.)
(No Model.)
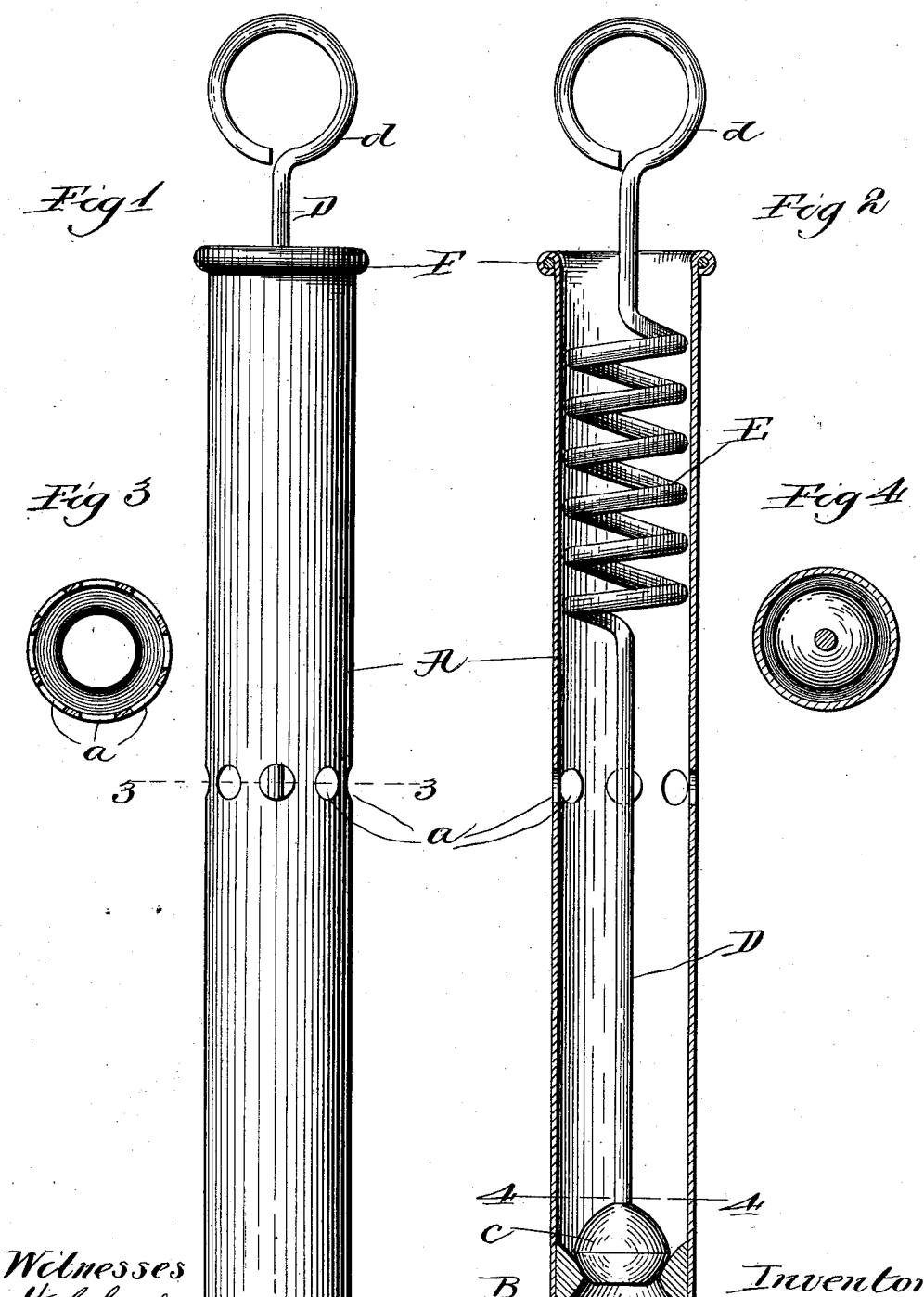

UNITED STATES PATENT OFFICE.

FRANK E. SARGENT, OF CHICAGO, ILLINOIS.

CREAMER.

SPECIFICATION forming part of Letters Patent No. 608,482, dated August 2, 1898.

Application filed January 15, 1898. Serial No. 666,801. (No model.)

*To all whom it may concern:*

Be it known that I, FRANK E. SARGENT, a citizen of the United States of America, and a resident of Chicago, county of Cook, and State of Illinois, have invented certain new and useful Improvements in Creamers, of which the following is a specification.

The object of the invention is to provide means for removing the cream from milk-bottles.

It is common practice to deliver milk to customers in small bottles or jars, and to enable the customer to secure the cream from the milk in the most satisfactory manner the bottles should not be emptied until the cream has had an opportunity to raise and has been first removed. Because of the contracted neck of such a vessel it has not heretofore been practicable to secure the cream in this manner, and consequently the bottle has necessarily been emptied of its contents into a bowl or pan, from which the cream might be taken by means of a spoon or similar skimmer.

The present invention consists in a vessel in the form of a cylindrical tube open at both ends and provided with a valve for closing one (its lower) end and having lateral apertures through which the cream may enter when the tube is inserted in the bottle.

In the accompanying drawings, Figure 1 is an elevation of the improved creamer. Fig. 2 is a longitudinal central section of the same. Fig. 3 is a transverse section of the tube on the line 3 3 of Fig. 1, and Fig. 4 is a transverse section of the tube on the line 4 4 of Fig. 2.

The body or main member of the creamer consists of a cylindrical tube A, open at both ends and preferably of uniform diameter throughout its length and made of sheet metal, such as tin. This tube has a circumferentially-arranged series of apertures $a$ intermediate of its ends.

An annulus B is fitted within the lower end of the tube A, so as to contract its aperture and provide a seat for a plug-valve C, carried by a stem D, projecting through the tube A and being provided at its outer end with a ring $d$ or similar device, by which it may be conveniently controlled. The stem D is given a spiral form through a part of its length, as shown at E, the diameter of the spiral being approximately the same as the caliber of the tube A, so that the valve C may be guided to its seat. The annulus B is conical in cross-section, so that no abrupt shoulders or pockets are formed; but the entrance to the tube is an inwardly-tapering mouth.

Milk-bottles are usually completely filled, so that nothing of material size can be inserted without causing an overflow. In the use of my improved creamer the upper end of the tube is grasped between two fingers, the beading F enabling the user to more securely hold it. The thumb is inserted into the ring $d$ and the valve C is raised. The lower end of the tube A being inserted into the neck of the bottle, the cream enters it, passing the valve, and the tube may be allowed to descend until the level of the milk is reached. The valve now being closed, the creamer is removed and may be discharged of its contents into a receiving vessel by again lifting the valve. The creamer being again inserted into the bottle may now be sunk to a sufficient depth to permit the cream to enter through the apertures $a$, the valve C preventing the entrance of the milk, though the end of the creamer may have been inserted into it. The creamer may be pushed down until all of the cream has entered it, and being now lifted out carries the cream with it to be discharged into a receiving vessel, as before.

I do not desire to be restricted to the exact form or details of construction, the essential feature being that the tube be of such form that it may enter the contracted mouth of the bottle and the end of the tube be contracted so that its orifice may be controlled by means of a valve, which may be lifted and permit the liquid to pass it, the tube being provided with lateral apertures.

I claim as my invention—

1. In a creamer the combination with a cylindrical tube having an inwardly-tapering aperture at one end, of a plug-valve for such aperture, and a stem for such valve leading through the tube.

2. In a creamer the combination with a cylindrical tube open at both ends and having a series of circumferentially-arranged lateral apertures, of a valve for closing one end of the tube, and a stem for controlling the valve and leading through the tube.

3. In a creamer the combination with a cylindrical tube having an aperture at one end of less diameter than the caliber of the tube and a flaring mouth beyond such aperture, and having a series of circumferentially-arranged lateral apertures intermediate of its ends, of a plug-valve for closing such end aperture, and a lift-stem for the valve and leading through the tube.

Signed by me, at Chicago, this 12th day of January, 1898.

FRANK E. SARGENT.

Witnesses:
  LOUIS K. GILLSON,
  HESTER BAIRD.